C. K. LASSITER.
METAL CUTTING TOOL.
APPLICATION FILED DEC. 11, 1908.
965,587.
Patented July 26, 1910.
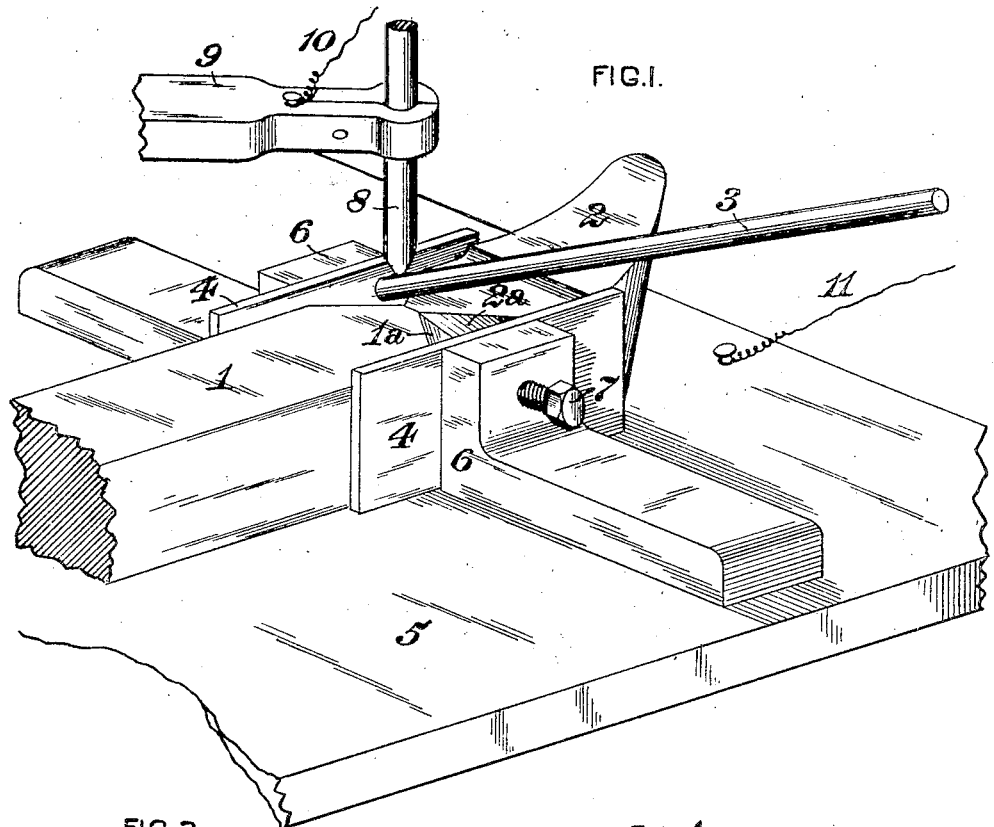
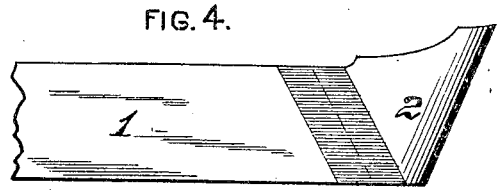
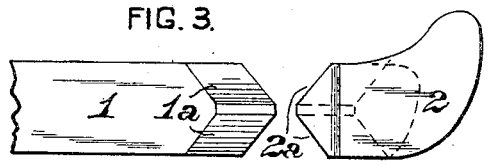
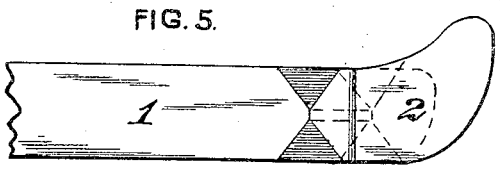
WITNESSES
James C. Herron
S. R. Bell
INVENTOR
C. K. Lassiter
by Snowden Bell
Att'y.

UNITED STATES PATENT OFFICE.

COLUMBUS K. LASSITER, OF RICHMOND, VIRGINIA.

METAL-CUTTING TOOL.

965,587.

Specification of Letters Patent. Patented July 26, 1910.

Application filed December 11, 1908. Serial No. 467,014.

*To all whom it may concern:*

Be it known that I, COLUMBUS K. LASSITER, of Richmond, in the county of Henrico and State of Virginia, have invented a certain new and useful Improvement in Metal-Cutting Tools, of which improvement the following is a specification.

My invention relates to the manufacture of tools for cutting metal, and its object is to effect a substantial economization of the cost of tools of such class, by providing a metal cutting tool comprising an end section having a cutting edge, composed of so-called "high speed" alloy steel, of any of the known compositions which are adapted to withstand wear and extremely high heat to which the tool is subjected in performing its work, and a stock or body of low cost carbon steel serving as a support and carrier for the high speed cutting end section and a medium for carrying off and radiating the heat developed in cutting, said cutting end section and stock or body being connected by welding them, electrically or by oxy-acetylene gas, through the intermediation of an interposed mass of cementing medium of metal having a high melting point.

It is well known to those skilled in the art that high speed alloy steel will withstand a high temperature without losing temper, and, by my invention, a tool is produced having a cutting portion, of comparatively small size, possessing this property, and a body, of comparatively large size, of a material which is not only very much less expensive than if formed of high speed steel, as in ordinary practice, but is capable of withstanding, without deterioration, the high temperature which is necessary to re-dress and re-treat the cutting ends of high speed steel tools. The substantial resultant economy thereby attained in the cost of the complete tool, will be self evident.

The improvement claimed is hereinafter fully set forth.

In the accompanying drawings: Figure 1 is a view, in perspective, illustrating an assemblage of parts suited for carrying out my invention; Fig. 2, a side view, in elevation, of an end cutting section and the adjoining portion of the stock of a cutting tool, before being connected; Fig. 3, a plan or top view of the same; Fig. 4, a side view of a portion of a completed tool manufactured in accordance with my invention; and, Fig. 5, a plan or top view of the same.

For the practice of my invention, I provide a stock or body, 1, and a cutting end section, 2. The stock, 1, is ordinarily of rectangular transverse section and is of proper length to be secured in a tool holder, and, with the cutting end section hereinafter described, to project sufficiently far therefrom to enable the cutting edge of the tool to be applied to the work. The stock, 1, is formed of carbon steel, preferably 1.00 carbon spring steel, or analogous material suitable for the purpose. various compositions of which are known in the art. The cutting end section, 2, is a block of "high speed" alloy steel, of any suitable known composition, as, for example, that specified in the patent of Taylor and White, No. 668,270, dated February 19, 1901, and has a nose or cutting edge portion at one of its ends, and, for the remainder of its length, is substantially similar in transverse section to the stock or body. The cutting end section is of comparatively small size, relatively to the body, and may be desirably made by drop forging. In order to furnish a maximum amount of surface for the contact of an interposed flux or connecting medium, as well as to strengthen the heel of the cutting end section to resist jars and strains, the adjoining ends of both said section and of the stock are so shaped as to leave lateral spaces between them, preferably, as shown, by being formed with V shaped end faces, 1ª and 2ª, respectively, which are tapered or inclined downwardly and outwardly from narrow central downwardly inclined faces. While the best results will be obtained by providing such inclined faces on both the stock and the cutting end section, they may if preferred, be made of any other suitable shape which will admit of the intermediation, on sufficiently extended surfaces, of the cementing medium hereinafter specified.

The stock, 1, and cutting end section, 2, are united to form a composite tool, through the intermediation of a flux or cementing medium, consisting of a metal having a high melting point, as steel, which may be Bessemer, machinery, crucible, or of any other suitable composition, and which is melted between and to their adjoining end faces, preferably by the action of an electric current, although oxy-acetylene gas may be used in lieu thereof, and is derived from a rod or bar, 3, of such metal. This operation is effected, when the electric welding process is employed, by placing the central portions of the adjoining ends of the stock and cutting end section in, or nearly in, contact; applying two plates, 4, of carbon or other highly refractory material to their sides, opposite to and adjoining their plane of contact or approximate contact; clamping them on a metal plate or table, 5, in a vise or clamp, 6, by a set screw, 7, or other suitable means; and passing an electric current through a carbon point, 8, secured in a suitable holder, 9, and contacting with one end of the bar, 3, of cementing medium, which is held above the adjoining ends of the stock and cutting end section, and thence through said adjoining ends, the current being conveyed through wires, 10 and 11, and being controlled by a switch, in the ordinary manner of electrical welding. The bar, 3, of cementing medium, is thereby fused, and the adjoining ends of the stock and cutting end portion raised to a welding heat, or to or near the point of fusion, the fused cementing medium dropping into the spaces between the ends of the stock and end cutting portions and between the carbon plates, 4, and uniting with and firmly connecting the stock and cutting end portions, after which the current is switched off and the completed tool removed.

The facility and rapidity with which the method of manufacture above described can be practiced, as well as the great saving in cost of the completed tool, as compared with those in which the entire body, as well as the cutting portion, is composed of expensive high speed alloy steel, will be apparent to those skilled in the art, as will be the fact that the completed tool has all the capabilities of those heretofore used which are formed entirely of high speed alloy steel.

The method of making the cutting tool as herein set forth, is not claimed as of my present invention, as the same forms the subject matter of a divisional application, filed July 27, 1909, Ser. No. 509,923.

I claim as my invention and desire to secure by Letters Patent:

1. As a new article of manufacture, a metal cutting tool composed of a "high speed" alloy steel cutting end section and a stock or body, of less expensive material, as carbon steel, said members being so shaped as to present outwardly diverging spaces at their abutting ends, said ends being obliquely arranged to the line of strain so as to resist the separation of said members, and a mass of metal having a high melting point, as Bessemer steel connecting said end section and stock by being fused between and to the end section and stock in the lateral spaces between their adjoining ends.

2. As a new article of manufacture, a metal cutting tool composed of a "high speed" alloy steel cutting end section and a stock or body of less expensive material, as carbon steel, one at least of said members being formed with a V-shaped or tapering end, the abutting ends of the cutting end section and stock being obliquely arranged to the line of strain so as to resist the separation of the members, and a mass of metal having a high melting point, as Bessemer steel connecting said end section and stock by being fused between and to the end section and stock in the lateral spaces between their adjoining ends.

3. As a new article of manufacture, a metal cutting tool composed of a "high speed" alloy steel cutting end section and a stock or body of less expensive material, as carbon steel, said members having downwardly and outwardly inclined V-shaped faces on their adjoining ends, the apices of said faces being opposite each other, and a mass of metal, as Bessemer steel, connecting said end section and stock by being fused between and to the end section and stock in the lateral spaces between their adjoining V-shaped ends.

C. K. LASSITER.

Witnesses:
J. H. MAUER,
WM. B. WEST.